United States Patent
Kubota

(10) Patent No.: US 10,221,902 B2
(45) Date of Patent: Mar. 5, 2019

(54) TEMPERATURE-SENSITIVE FLUID FAN CLUTCH DEVICE

(71) Applicant: USUI KOKUSAI SANGYO KAISHA LIMITED, Shimizu-cho, Sunto-gun, Shizuoka (JP)

(72) Inventor: Satoshi Kubota, Shimizu-cho (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 15/328,741

(22) PCT Filed: Jul. 28, 2015

(86) PCT No.: PCT/JP2015/071360
§ 371 (c)(1),
(2) Date: Jan. 24, 2017

(87) PCT Pub. No.: WO2016/017633
PCT Pub. Date: Feb. 4, 2016

(65) Prior Publication Data
US 2017/0219024 A1    Aug. 3, 2017

(30) Foreign Application Priority Data

Jul. 29, 2014 (JP) ................................. 2014-153564

(51) Int. Cl.
*F16D 35/02* (2006.01)
*F01P 7/04* (2006.01)

(52) U.S. Cl.
CPC ........... *F16D 35/02* (2013.01); *F16D 35/022* (2013.01); *F16D 35/023* (2013.01);
(Continued)

(58) Field of Classification Search
CPC .............................. F16D 35/022; F16D 35/026
See application file for complete search history.

(56) References Cited

U.S. PATENT DOCUMENTS 4,351,426 A * 9/1982 Bopp .................... F16D 35/022
123/41.12
4,828,088 A * 5/1989 Mohan .................. F16D 35/024
192/103 F
(Continued)

FOREIGN PATENT DOCUMENTS

JP          3033795         11/1996
JP        2000-74098         3/2000
(Continued)

OTHER PUBLICATIONS

International Search Report dated Oct. 20, 2015.

*Primary Examiner* — Mark A Manley
(74) *Attorney, Agent, or Firm* — Gerald E. Hespos; Michael J. Porco; Matthew T. Hespos

(57) ABSTRACT

A temperature-sensitive fluid fan clutch device includes an oil reservoir chamber in a case supported by a rotating shaft that has a drive disk fixed thereto. Plural dams are provided outward of the drive disk, and oil circulating flow passages contiguously to the dams extend between a torque transmission chamber and the oil reservoir chamber. A valve opens and closes an oil circulation flow hole of the oil reservoir chamber due to a change in temperature of a temperature-sensitive body. An oil effective contact area in a torque transmission gap between a drive side and a driven side is varied to control rotation torque transmission from the drive side to the driven side. An oil collection valve member independently opens and closes at least one of the oil circulating flow passages. The temperature-sensitive fluid fan clutch device inhibits a cold "drag" phenomenon and reduces fan power loss and fuel consumption.

1 Claim, 4 Drawing Sheets

(52) U.S. Cl.
CPC ............ *F16D 35/026* (2013.01); *F01P 7/042* (2013.01); *F16D 2500/10487* (2013.01)

(56) References Cited

U.S. PATENT DOCUMENTS

| | | | | |
|---|---|---|---|---|
| 5,701,985 | A | * 12/1997 | Martin | ................. F16D 35/022 192/58.681 |
| 6,125,981 | A | 10/2000 | Ito et al. | |
| 2003/0230460 | A1 | 12/2003 | Usui et al. | |
| 2010/0025177 | A1* | 2/2010 | Fukushima | ........... F16D 35/022 192/58.68 |

FOREIGN PATENT DOCUMENTS

| | | |
|---|---|---|
| JP | 2001-27260 | 1/2001 |
| JP | 2001-227566 | 8/2001 |
| JP | 2004-3603 | 1/2004 |
| JP | 2005-172170 | 6/2005 |

\* cited by examiner

TEMPERATURE-SENSITIVE FLUID FAN CLUTCH DEVICE

BACKGROUND

1. Field of the Invention

The present invention generally relates to fluid fan clutch devices of a type in which fan rotation for engine cooling in an automobile or the like is controlled by following a change in external ambient temperature or a change in rotation and, in more detail, relates to a temperature-sensitive fluid fan clutch device for promoting speedup in reaction of fan rotation and inhibition of cold "drag".

2. Description of the Related Art

Conventionally, as a fan clutch device which controls fan rotation for engine cooling in an automobile or the like to supply a controlled cooling blast amount to an engine, there are a temperature-sensitive type, an external control type, and so forth. The temperature-sensitive type includes one in which: the inside of a sealed housing formed of a case and a cover is partitioned by a partition plate having an oil supply adjustment hole into an oil reservoir chamber and a torque transmission chamber having a drive disk built therein; a dam is formed on part of an inner peripheral wall surface of the sealed housing facing an outer circumferential wall of the drive disk where oil is collected and accumulated in rotation; an oil circulating flow passage (oil collection duct) contiguous to the dam is provided between the torque transmission chamber and the oil reservoir chamber; and an oil supply valve member is provided therein, the oil supply valve member opening the supply adjustment hole of the partition plate when external ambient temperature exceeds a set value and closing the supply adjustment hole of the partition plate when the temperature is equal to or lower than the set value, wherein an effective contact area of oil in a torque transmission gap provided between the drive disk and a wall surface of the sealed housing near outside facing the drive disk is increased and decreased to control rotation torque transmission from the drive side to the sealed housing on the driven side. The fan clutch device of this type generally takes a scheme of detecting atmospheric temperature by a bimetal of a strap type or spiral type and adjusting opening of the oil supply adjustment hole in accordance with this detection value (refer to Japanese Patent Application Laid-Open No. 2000-74098).

The conventional temperature-sensitive fluid fan clutch device has a mechanism in which: by oil supplied from the oil reservoir chamber via the oil supply adjustment hole of the partition plate to the torque transmission chamber, drive torque of the drive disk is transmitted to the sealed housing (case) to cause a fan attached to the sealed housing to rotate; and by a dam formed on part of the inner periphery on a sealed housing side facing the outer circumference of the drive disk, oil is collected by the oil circulating flow passage (oil collection duct) leading to the oil reservoir chamber from a torque transmission chamber side.

However, in the case of this scheme of collecting oil through the oil circulating flow passage (oil collection duct) by the dam formed on part of the inner periphery on the sealed housing side facing the outer circumference of the drive disk, since the collection capability of the dam is relatively low at low input rotation speed, in particular, initially at low temperature, the oil collection amount is insufficient and causes an undesired rotation of the fan caused by oil remaining in the torque transmission chamber. This phenomenon is referred to herein as a "drag" or "cold pump out" phenomenon, and creates an increase of hysteresis action that means a difference in operating temperature between temperature rising characteristics and temperature falling characteristics. In other words, it is meant that large hysteresis action means low collection capability of the dam and, with this dam's insufficient collection capability, oil remaining in the torque transmission chamber causes a "drag" phenomenon. That is, the conventional temperature-sensitive fluid fan clutch device has not achieved high reaction (reduction in hysteresis action) from an ON (activated) state to an OFF (non-activated) state, and the "drag" phenomenon when it is cold cannot be inhibited. From these, the device has a problem that a fan power loss is large and reduction in fuel consumption is not promoted.

The present invention was made to solve the above problem, and is to provide a temperature-sensitive fluid fan clutch device in which the numbers of dams and oil circulating flow passages located at the outer periphery of the drive disk is increased to improve oil collection power, and high reaction from an ON state to an OFF state (reduction in hysteresis action) and inhibition of a "drag" phenomenon occurred when it is cold are promoted, and thereby reduction in fan power loss and reduction in fuel consumption can be achieved.

SUMMARY

A temperature-sensitive fluid fan clutch device according to the present invention includes: a sealed housing formed of a non-magnetic case and a cover attached to the case, and supported via a bearing on a rotating shaft having a drive disk fixed thereto; a partition plate having an oil supply adjustment hole and partitioning an inside of the sealed housing into an oil reservoir chamber and a torque transmission chamber having the drive disk built therein; a dam provided on part of an inner peripheral wall surface of the sealed housing facing an outer circumferential wall of the drive disk at which outer circumferential wall oil is collected and accumulated in rotation; an oil circulating flow passage contiguous to the dam and provided between the torque transmission chamber and the oil reservoir chamber; and an oil supply valve member provided in the sealed housing in such a manner that the oil supply valve member operates in conjunction with deformation with a change in temperature of a temperature-sensitive body, the oil supply valve member opening the supply adjustment hole of the partition plate when external ambient temperature exceeds a set value and closing the supply adjustment hole of the partition plate when the temperature is equal to or lower than the set value, wherein an effective contact area of oil in a torque transmission gap provided between the drive disk and a wall surface of the sealed housing near outside facing the drive disk is increased and decreased to control rotation torque transmission from a rotating shaft on a drive side to the sealed housing on a driven side, and wherein two or more of said dams and two or more of the oil circulating flow passages are provided, an oil collection valve member which opens and closes at least one of the oil circulating flow passages is provided in the oil reservoir chamber in such a manner that the oil collection valve member operates in conjunction with deformation with a change in temperature of the temperature-sensitive body common to the oil supply valve member and is activated separately from the oil supply valve member.

The temperature-sensitive fluid fan clutch device according to the present invention has advantageous effects as follows: the oil collection capability from the torque transmission chamber to the oil reservoir chamber can be improved, and a balance between oil supply and collection is retained by opening and closing at least one of the oil circulating flow passages by the oil collection valve member, so that reduction in hysteresis action in temperature-sensitive characteristics and inhibition of the cold "drag" phenomenon can be achieved thanks to the configuration in which two or more dams located at the outer periphery of the drive disk and two or more oil circulating flow passages (oil collection ducts) are provided, and at least one of the oil circulating flow passages is provided so as to be opened and closed by the oil collection valve member which is activated separately from the oil supply valve member according to deformation of a temperature-sensitive body common to the oil supply valve member.

DETAILED DESCRIPTION

Figure 1:
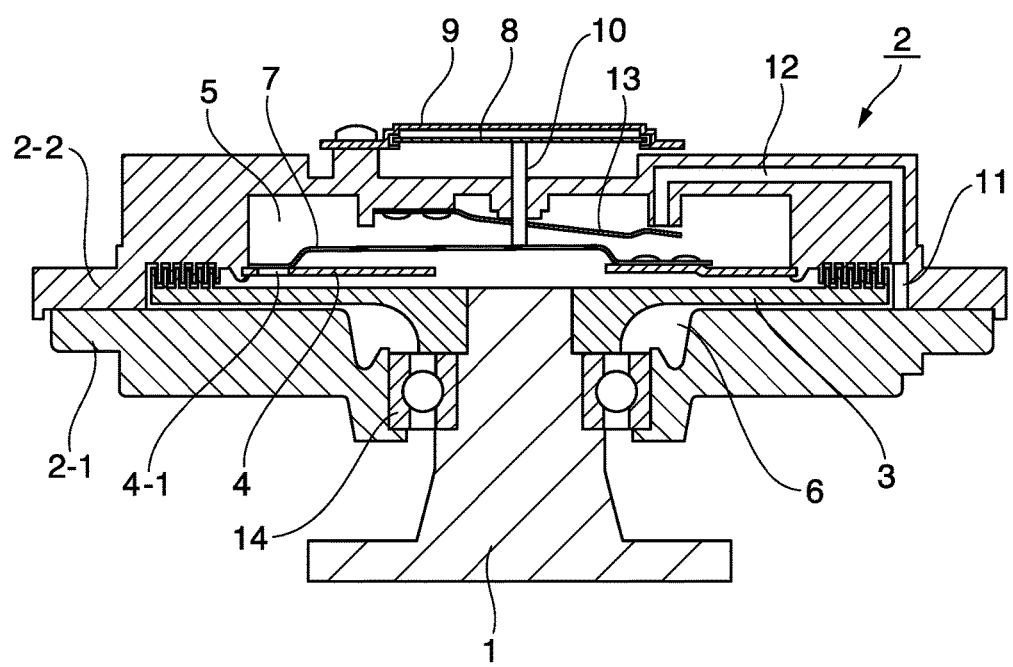
FIG. 1 is a longitudinal sectional view depicting an embodiment of a temperature-sensitive fluid fan clutch device according to the present invention.
Figure 2:
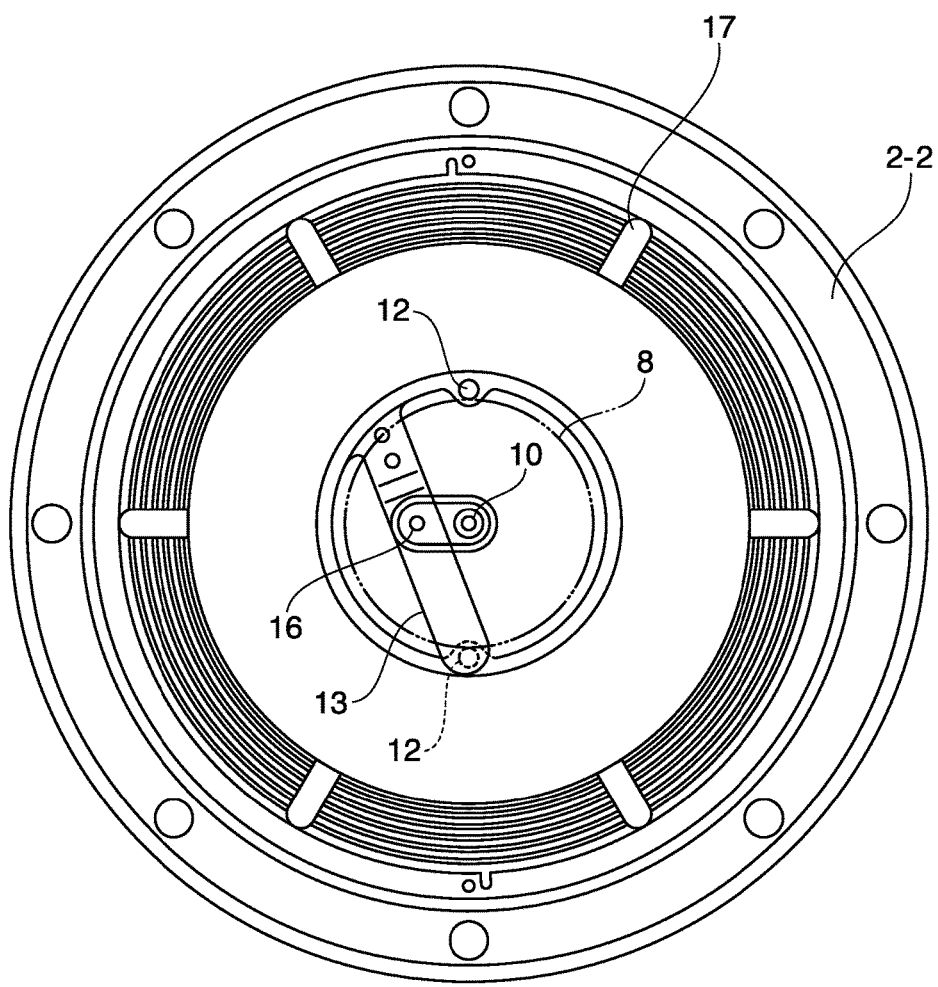
FIG. 2 is a diagram of the inside of a cover of a sealed housing of the temperature-sensitive fluid fan clutch device when viewed from a drive side.

In a temperature-sensitive fluid fan clutch device depicted in FIG. 1 and FIG. 2, by a rotating shaft (driving shaft) 1 which rotates by driving of a driving unit (engine), a sealed housing 2 formed of a case 2-1 and a cover 2-2 is supported via a bearing 14. The inside of the sealed housing 2 is partitioned by a partition plate 4 with an oil supply adjustment hole 4-1 into an oil reservoir chamber 5 and a torque transmission chamber 6. Inside the torque transmission chamber 6, a drive disk 3 affixed at a tip of the rotating shaft 1 is accommodated so that a torque transmission gap is retained between the drive disk and an inner peripheral surface of the torque transmission chamber 6. In this regard, an example is depicted herein in which a labyrinth mechanism is provided on the facing surfaces between the cover 2-2 of the torque transmission chamber 6 and the drive disk 3.

An oil supply valve member 7, which performs opening and closing of the oil supply adjustment hole 4-1 provided through the partition plate 4, is formed of a plate spring, with its one end riveted to a wall surface of the partition plate 4 on the oil reservoir chamber 5 side and the other end thereof positioned at the adjustment hole part. And the oil supply valve member is provided inside via an oil supply connecting rod 10 so as to operate according to deformation with a change in external ambient temperature by a temperature-sensitive body 8 that is made of a disk-shaped, plate-shaped bimetal with one end thereof fixed to a support fitting 9 whose one end is riveted to a front surface of the cover 2-2.

The dam 11 is provided on the inner peripheral wall surface of the cover 2-2 which faces an outer circumferential wall surface of the drive disk 3 where oil is collected and accumulated during rotational operation, over an entire width thickness of the drive disk 3. In the present invention, two or more (here, two) dams are equidistantly provided over the entire inner peripheral wall surface of the cover 2-2, and acts as a pumping function with an oil circulating flow passage 12 which connects from the torque transmission chamber 6 side to the oil reservoir chamber 5 side and is provided in the cover 2-2 for each dam 11. An oil collection valve member 13 which performs opening and closing at least one of these two oil circulating flow passages 12, has its one end riveted to an inner wall surface opposite to the partition plate 4 of the oil reservoir chamber 5, its intermediate part is integrally fixed to an oil collection connecting rod 16 provided adjacently to the oil supply connecting rod 10 and separately from the connecting rod 10, and the other end is positioned at an opening of the oil circulating flow passage 12 on the oil reservoir chamber 5 side. And the oil collection valve member 13 is provided inside via the connecting rod 16 so as to operate according to deformation with a change in external ambient temperature by the disc-shaped temperature-sensitive body 8 common to the oil supply valve member 7. That is, the oil supply valve member 7 opens and closes the oil supply adjustment hole 4-1 via the oil supply connecting rod 10 dedicated to that member 7, and the oil collection valve member 13 opens and closes the oil circulating flow passage 12 via the oil collection connecting rod 16 dedicated to that member 13 with reverse operation to the oil supply valve member 7.

In the present invention, the two or more dams 11 and the oil circulating flow passages (oil collection ducts) 12 are provided on the outer periphery of the drive disk 3 in order to enhance oil collection capability and also to promote a high reaction (reduction in hysteresis action) from an ON (activated) state to an OFF (non-activated) state and inhibition of a "drag" phenomenon occurred when it is cold. Also, the oil collection valve member 13 which opens and closes at least one oil circulating flow passage 12 according to deformation of the temperature-sensitive body is provided because if the oil collection capability is too high, collection power becomes excessive more than oil supply power, resulting in an unbalance between oil supply and collection and making it impossible to obtain desired characteristics. That is, if oil supply and collection are out of balance, a reaction of the clutch device from an OFF state to an ON state is delayed, thereby posing a problem that, for example, preferable temperature-sensitive characteristics cannot be obtained. Thus, the oil collection valve member 13 which activates at least one oil circulating flow passage 12 by deformation of the temperature-sensitive body common to the oil supply valve member 7 is provided to retain the balance between oil supply and collection.

In the drawing, 17 denotes a notched guide provided on the cover 2-2 side to facilitate an inflow of oil into the labyrinth mechanism unit provided on the surfaces, facing each other, of the torque transmission chamber 6 on the cover 2-2 side and the drive disk 3.

In the structure of the temperature-sensitive fluid fan clutch device, when atmospheric temperature is high with deformation of the temperature-sensitive body 8 for oil supply, the oil supply valve member 7 is separated from the partition plate 4 via the oil supply connecting rod 10 to cause the oil supply adjustment hole 4-1 to open so that oil in the oil reservoir chamber 5 is supplied to the torque transmission chamber 6. Simultaneously, the oil collection valve member 13 is activated, via the oil collection connecting rod 16 dedicated to that member 13, conversely to the oil supply valve member 7 to cause the oil circulating flow passage 12 to be closed down. On the contrary, when the atmospheric temperature is low, the oil supply valve member 7 is pressed via the oil supply connecting rod 10 to a partition plate 4 side to cause the oil supply adjustment hole 4-1 to be closed, which stops oil supply to the torque transmission chamber 6 and, simultaneously, causes the oil circulating flow passage 12 to be opened via the oil collection connecting rod 16 for oil collection.

By contrast, in the case of a conventional device without having two or more dams 11 and oil circulating flow passages (oil collection ducts) 12 on the outer periphery of the drive disk 3, a fan "drag" phenomenon occurs due to oil present in the torque transmission chamber 6 at the time of restart from an engine stop state or at the time of sudden acceleration from a low input rotation state to a high input rotation speed during travelling. In detail, the oil amount of the torque transmission chamber 6 is defined by a difference between an oil collection amount by the dams 11 from the torque transmission chamber 6 and an oil supply amount from the oil reservoir chamber 5 through the oil supply adjustment hole 4-1 to the torque transmission chamber 6. Even if atmospheric temperature decreases to cause the oil supply adjustment hole 4-1 to be closed to decrease the amount of oil to be supplied, a phenomenon in which fan rotating speed does not decrease occurs for a certain period. This is because since the oil collection amount by the dam is small due to insufficient collection capability by the dam, it takes time to decrease the amount of oil in the torque transmission chamber 6 (there is a time lag) and thus torque is transmitted for a while during that time. On the other hand, since the oil collection capability of the dam is relatively low in low input rotation speed, a fan "drag" phenomenon occurs due to oil present in the torque transmission chamber 6 at the time of restart from an engine stop state or at the time of sudden acceleration from a low input rotation state to a high input rotation speed during travelling.

In the case of the temperature-sensitive fluid fan clutch device of the present invention depicted in FIG. 1 and FIG. 2, when it is cold, reduction of drag is promoted because the oil collection amount increases by two or more dams 11 and oil circulating flow passages (oil collection ducts) 12, as described above. Also, when temperature increases (from low temperature to high temperature), at least one oil circulating flow passage 12 becomes in a state of reducing the oil collection amount by the oil collection valve member 13 which is activated by deformation of the temperature-sensitive body common to the oil supply valve member 7, and therefore a balance with oil supply power is obtained and characteristics are established. On the contrary, when temperature decreases (from high temperature to low temperature), one or more oil circulating flow passages 12 are opened to bring about a state of increasing the oil collection amount. Therefore, hysteresis decreases and the "drag" phenomenon can be inhibited.

Figure 3:
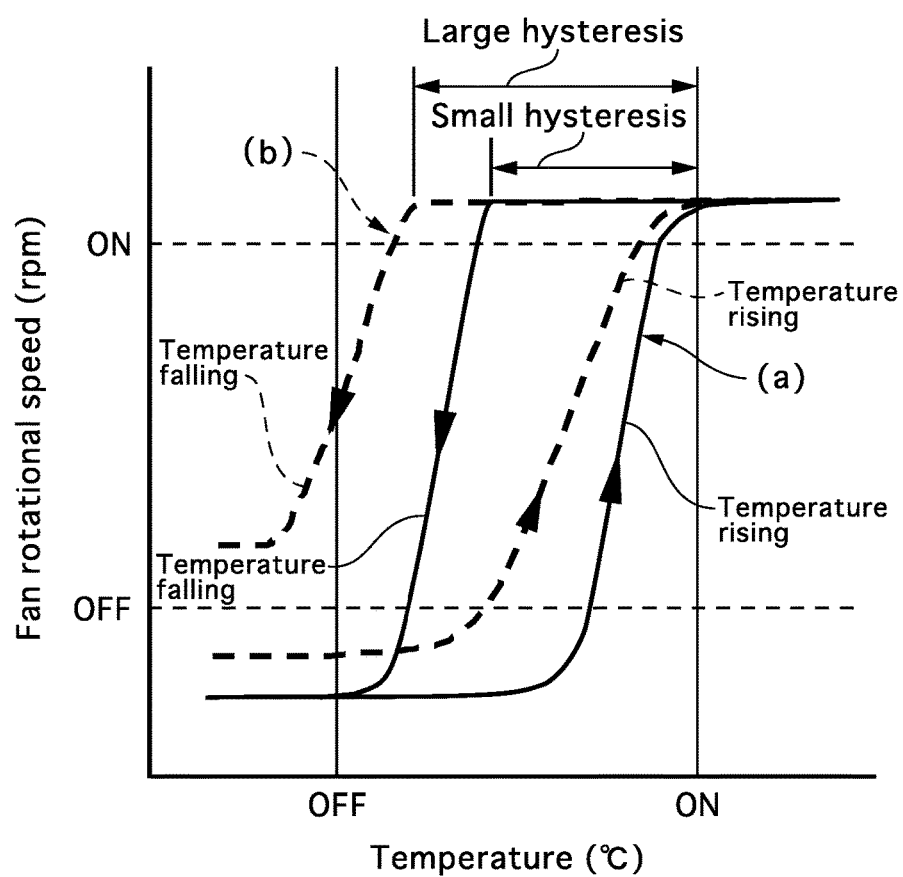
FIG. 3 is a characteristic diagram in which temperature-sensitive characteristics are compared between the present invention and a conventional example, in which (a) is a characteristic diagram of the present invention and (b) is a conventional characteristic diagram.

As depicted in FIG. 3 by comparing temperature-sensitive characteristics between the present invention and the conventional example at startup, in the case of the conventional device without having two or more dams 11 and oil circulating flow passages (oil collection ducts) 12, the oil collection amount is insufficient when temperature decreases (from high temperature to low temperature), high fan rotating speed is kept to cause a drag phenomenon and increase hysteresis. By contrast, in the case of the temperature-sensitive fluid fan clutch device of the present invention, when temperature decreases (from high temperature to low temperature), the oil collection pumping function is improved due to the effect of two or more dams 11 and oil circulating flow passages (oil collection ducts) 12, and hysteresis action in temperature-sensitive characteristics is reduced, thereby effectively inhibiting the "drag" phenomenon. Also, with this drag time being shortened, it is possible to speed up the reaction of fan rotation.

In the following, an example of the present invention is described.

EXAMPLE

The temperature-sensitive fluid fan clutch device of the present invention depicted in FIG. 1 and FIG. 2 was used to investigate fan rotation due to drag at startup when atmospheric temperature was at ordinary temperatures as a test condition. The results are depicted in FIG. 4 in comparison with a conventional device without having two or more dams and oil circulating flow passages (oil collection ducts).

Figure 4:
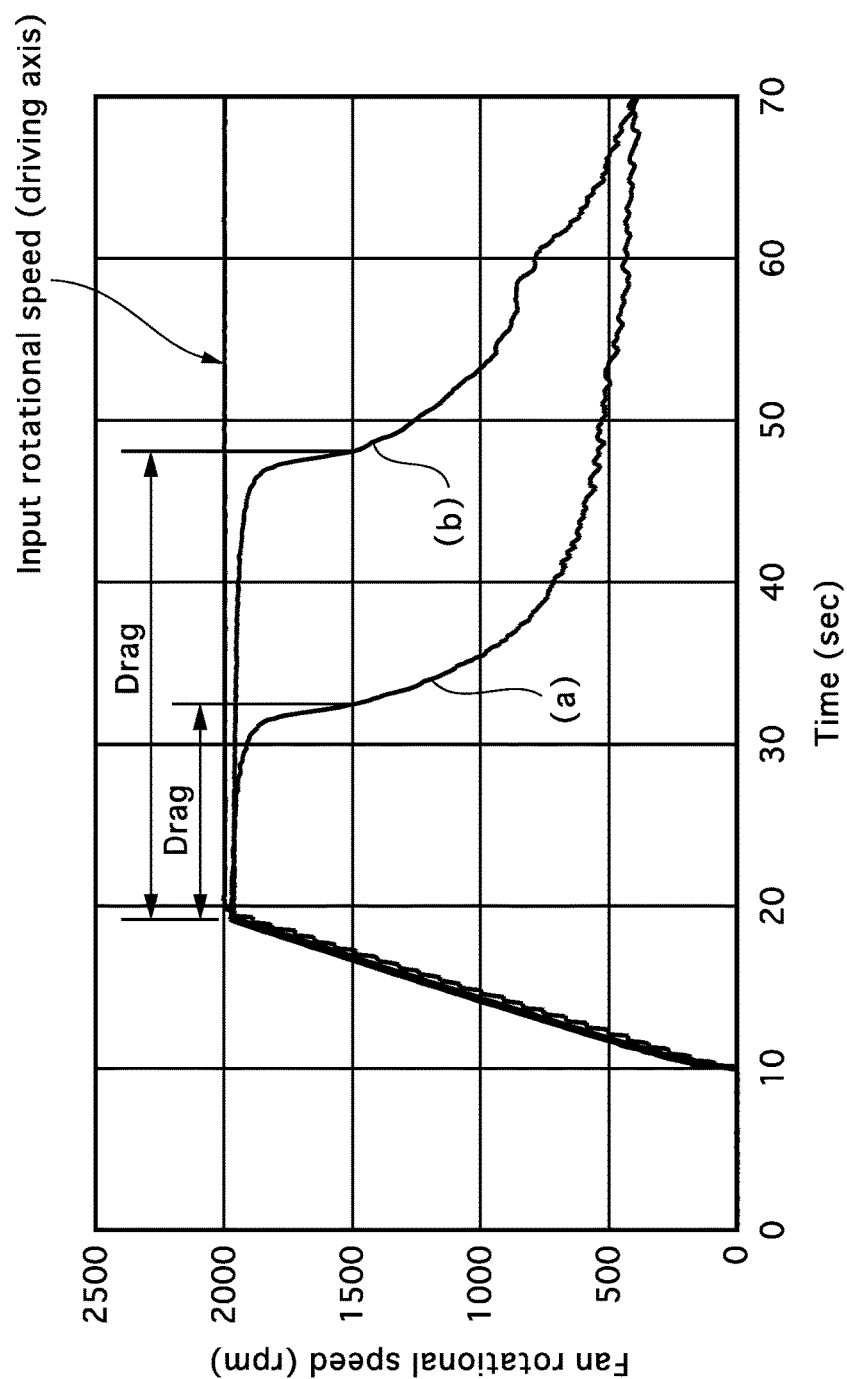
FIG. 4 is a characteristic diagram in which fan rotation due to cold drag at startup in the embodiment of the present invention is compared with the conventional example, in which (a) is a characteristic diagram of the present invention and (b) is a conventional characteristic diagram.

As evident from the results depicted in FIG. 4, when input rotation speed continues constantly at 2000 rpm after startup, a time interval till when a fan rotational speed decreases to 1500 rpm, namely, a startup drag time, is approximately thirty seconds as depicted in (b) in the case of the conventional device because the oil collection amount by the dam is small due to insufficient collection capability. By contrast, in the temperature-sensitive fluid fan clutch device of the present invention (when provided with two dams and two oil circulating flow passages), the time is shorter, that is, approximately fifteen seconds as depicted in (a), due to an increase in oil collection amount, thereby reducing "drag" at startup.

REFERENCE SIGNS LIST

1 . . . rotating shaft (driving shaft)
2 . . . sealed housing
2-1 . . . case
2-2 . . . cover
3 . . . drive disk
4 . . . partition plate
4-1 . . . oil supply adjustment hole
5 . . . oil reservoir chamber
6 . . . torque transmission chamber
7 . . . oil supply valve member
8 . . . temperature-sensitive body
9 . . . support fitting
10 . . . oil supply connecting rod
11 . . . dam
12 . . . oil circulating flow passage
13 . . . oil collection valve member
14 . . . bearing
16 . . . oil collection connecting rod
17 . . . notched guide

The invention claimed is:

1. A temperature-sensitive fluid fan clutch device comprising:
   a sealed housing (2) formed of a non-magnetic case (2-1) and a cover (2-2) attached to the case (2-1), and supported via a bearing (14) on a rotating shaft (1) having a drive disk (3) fixed thereto;
   a partition plate (4) having an oil supply adjustment hole (4-1) and partitioning an inside of the sealed housing into an oil reservoir chamber (5) and a torque transmission chamber (6) having the drive disk (3) built therein;

at least two dams (11) provided on part of an inner peripheral wall surface of the sealed housing (2) facing an outer circumferential wall of the drive disk (3) where oil is collected and accumulated during rotation;
at least two oil circulating flow passages (12) contiguous respectively to the dams (11) and provided between the torque transmission chamber (6) and the oil reservoir chamber (5); and
an oil supply valve member (7) provided in the sealed housing (2) in such a manner that the oil supply valve member (7) operates according to deformation with a change in temperature of a temperature-sensitive body (8) provided on a front surface of the cover (2-2), the oil supply valve member (7) opening the supply adjustment hole (4-1) of the partition plate (4) when external ambient temperature exceeds a set value and closing the supply adjustment hole (4-1) of the partition plate (4) when the temperature is equal to or lower than the set value, wherein:
an effective contact area of oil in a torque transmission gap provided between the drive disk (3) and a wall surface of the sealed housing (2) near outside facing the drive disk (3) is increased and decreased to control rotation torque transmission from the rotating shaft (1) on a drive side to the sealed housing (2) on a driven side,
at least one oil collection valve member (13) that opens and closes at least one of the oil circulating flow passages (12) is provided in the oil reservoir chamber (5) in such a manner that the oil collection valve member (13) operates in conjunction with deformation with a change in temperature of the temperature-sensitive body (8) common to the oil supply valve member (7) and is activated separately from the oil supply valve member (7) with reverse operation to/from the oil supply valve member (7), and
the oil collection valve member (13) is controlled with an oil collection connecting rod (16) by the temperature-sensitive body (8) and the oil supply valve member (7) is connected with an oil supply connecting rod (10) by the temperature-sensitive body (8) where the oil collection connecting rod (16) and the oil supply connecting rod (10) are operated by deformation of the temperature sensitive body (8) with the oil collection connecting rod (16) and the oil supply connecting rod (10) at radially spaced locations.

\* \* \* \* \*